(12) United States Patent
Tsai et al.

(10) Patent No.: US 7,697,831 B1
(45) Date of Patent: Apr. 13, 2010

(54) AUTO-FOCUS WITH LENS VIBRATION

(75) Inventors: Richard Tsai, Arcadia, CA (US); Sarah Salemi, Los Angeles, CA (US)

(73) Assignee: Siimpel Corporation, Arcadia, CA (US)

( * ) Notice: Subject to any disclaimer, the term of this patent is extended or adjusted under 35 U.S.C. 154(b) by 412 days.

(21) Appl. No.: 11/676,991

(22) Filed: Feb. 20, 2007

(51) Int. Cl.
*G03B 3/00* (2006.01)
*G03B 13/00* (2006.01)

(52) U.S. Cl. ...................................... 396/125; 348/351
(58) Field of Classification Search ................. 348/351, 348/353, 356; 396/127, 125
See application file for complete search history.

(56) References Cited

U.S. PATENT DOCUMENTS

| | | | | |
|---|---|---|---|---|
| 5,036,399 | A * | 7/1991 | Mabuchi | 348/351 |
| 6,525,771 | B1 * | 2/2003 | Hirasawa | 348/347 |
| 7,389,042 | B2 * | 6/2008 | Lin et al. | 396/127 |
| 2005/0023435 | A1 * | 2/2005 | Yasuda | 250/201.2 |
| 2006/0193620 | A1 * | 8/2006 | Harrington et al. | 396/85 |
| 2007/0024155 | A1 * | 2/2007 | Calvet et al. | 310/309 |

FOREIGN PATENT DOCUMENTS

JP 03182711 A * 8/1991 ................... 396/95

OTHER PUBLICATIONS

U.S. Appl. No. 11/190,307, filed Jul. 26, 2005, Calvet et al.
U.S. Appl. No. 11/263,149, filed Oct. 31, 2005, Harrington et al.

* cited by examiner

*Primary Examiner*—Melissa J Koval
*Assistant Examiner*—Leon W Rhodes
(74) *Attorney, Agent, or Firm*—Haynes and Boone, LLP

(57) ABSTRACT

An improved approach to focusing a camera is provided. In one embodiment, a method of adjusting a focus of a camera includes translating a lens to a first position. The lens is vibrated relative to the first position, and a first image is captured on an image sensor while the lens is vibrated relative to the first position. A first sharpness score associated with the first image is calculated. The method also includes translating the lens to a second position. The lens is vibrated relative to the second position, and a second image is captured on the image sensor while the lens is vibrated relative to the second position. A second sharpness score associated with the second image is calculated. The first and second sharpness scores may be compared, and one of the first or second positions may be selected based on the comparison.

31 Claims, 4 Drawing Sheets

AUTO-FOCUS WITH LENS VIBRATION

BACKGROUND

1. Technical Field

The invention generally relates to the focusing of images captured by cameras.

2. Related Art

Various auto-focus techniques have been developed to provide in-focus camera images. In one such technique, a digital camera lens may be translated to various incremental positions at different distances from an image sensor. The image sensor captures an image at each incremental position while the lens remains stationary. A sharpness filter may be applied to each image to provide an associated sharpness score for each image. The lens position associated with the highest sharpness score may then be used for capturing in-focus images.

Unfortunately, this approach can sometimes be problematic for fine-grained incremental changes between lens positions. In such cases, images taken at adjacent or nearby positions may exhibit little difference from each other. Consequently, their associated sharpness scores may also exhibit very little difference. As a result, it can become difficult for a processor performing an auto-focus process to clearly identify a preferred lens position associated with an in-focus image over other lens positions associated with slightly out-of-focus images. Moreover, if there is little difference between the images in a given range, the processor may take longer and consume excessive processor resources to analyze a potentially large number of similar images in the range.

Although various non-linear functions (e.g., Sobel filters or Laplacian filters) may be used in an attempt to further distinguish between similar images, such functions are typically computationally-intensive and therefore require additional time and/or additional processor resources. Such implementations can accordingly increase the cost and decrease the overall efficiency of the auto-focus process.

SUMMARY

In accordance with one embodiment of the invention, a method of adjusting a focus of a camera includes translating a lens to a first position; vibrating the lens relative to the first position; capturing a first image on an image sensor from light received through the lens during the vibrating the lens relative to the first position; calculating a first sharpness score associated with the first image; translating the lens to a second position; vibrating the lens relative to the second position; capturing a second image on the image sensor from light received through the lens during the vibrating the lens relative to the second position; and calculating a second sharpness score associated with the second image.

In accordance with another embodiment of the invention, a miniature camera includes a stage; a lens secured relative to the stage; an image sensor adapted to capture images from light received through the lens; a function generator adapted to provide a control signal; an actuator adapted to: translate the lens to a plurality of positions relative to the image sensor, vibrate the lens relative to a first one of the positions while the image sensor captures a first image, and vibrate the lens relative to a second one of the positions while the image sensor captures a second image; and an autofocus processor adapted to calculate first and second sharpness scores associated with the first and second images, respectively.

In accordance with another embodiment of the invention, a miniature camera includes a lens; means for capturing images from light received through the lens; means for generating a control signal; means for translating the lens to a plurality of positions relative to the capturing means; means for vibrating the lens relative to a first one of the positions while the capturing means captures a first image; means for vibrating the lens relative to a second one of the positions while the capturing means captures a second image; and means for calculating first and second sharpness scores associated with the first and second images, respectively.

These and other features and advantages of the invention will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

In accordance with various embodiments of the invention, one or more lenses of a camera may be vibrated in order to provide improved accuracy in the determination of image sharpness. In this regard, controlled lens vibrations may be introduced during image capture operations performed during one or more auto-focus processes.

In various embodiments, the use of such vibrations may advantageously reduce the sharpness of out-of-focus scenes in captured images to a greater extent than the sharpness of in-focus scenes. As a result, sharpness filters applied to the captured images may more accurately distinguish between in-focus and out-of-focus images. Accordingly, lens positions corresponding to in-focus images can be easily determined.

Figure 1:
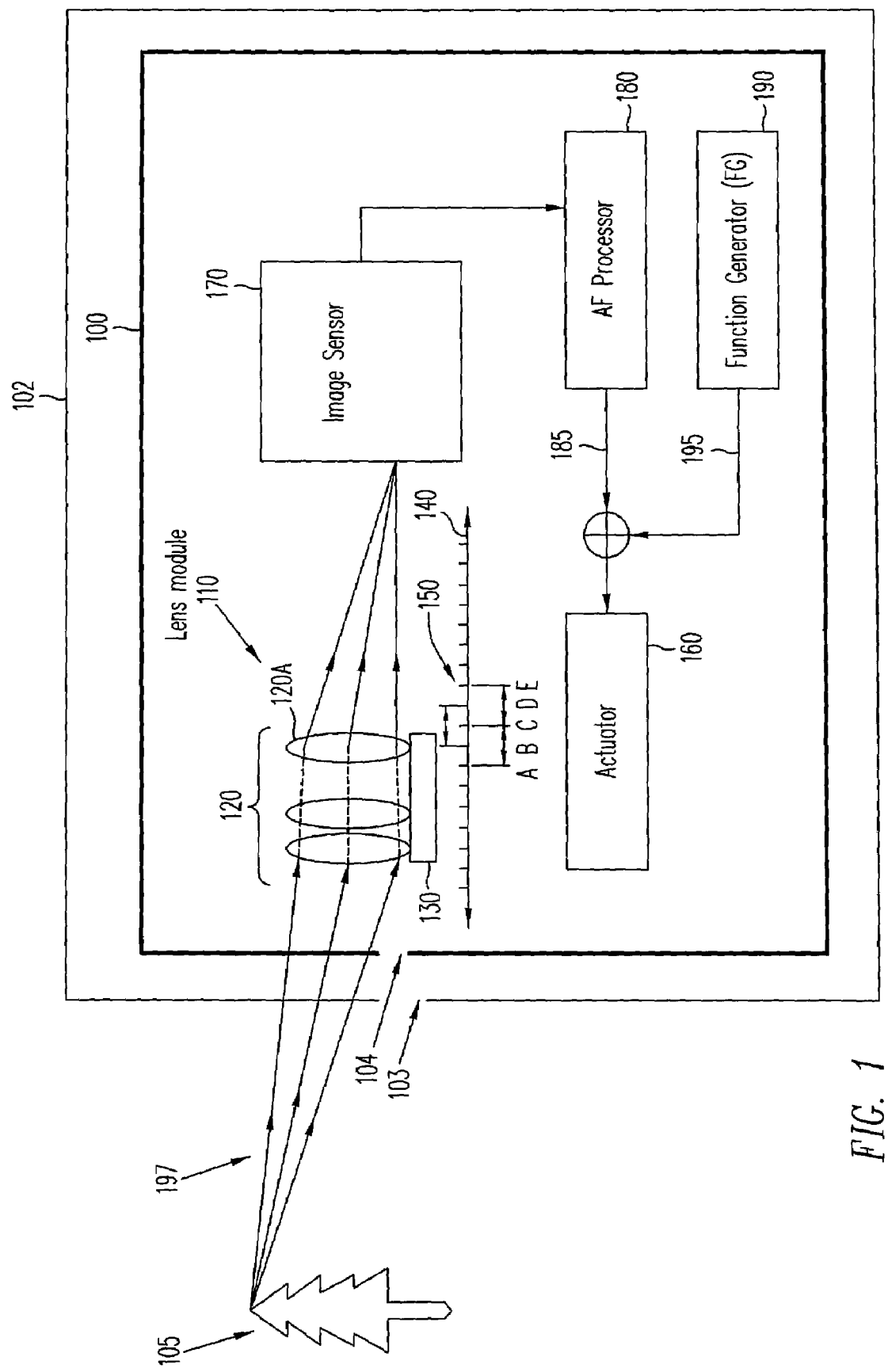
FIG. 1 illustrates a block diagram of a camera with an adjustable focus in accordance with an embodiment of the invention.

Referring now to the drawings wherein the showings are for purposes of illustrating embodiments of the invention only, and not for purposes of limiting the same, FIG. 1 illustrates a block diagram of a camera 100 with an adjustable focus in accordance with an embodiment of the invention. Camera 100 may be implemented, for example, as a digital still camera or a digital video camera.

In certain embodiments, camera 100 may be implemented as a miniature camera that is part of a personal electronic device 102 such as a portable computer, a laptop computer, a notebook computer, a pocket personal computer (pocket PC), a personal digital assistant (PDA), a mobile telephone, or other device. Device 102 and camera 100 include apertures 103 and 104, respectively, which may receive light 197 reflected from an external object 105.

As shown, camera 100 includes a lens module 110, an actuator 160, an image sensor 170, an auto-focus (AF) processor 180, and a function generator 190. Lens module 110 may include a plurality of lenses 120 secured relative to a stage 130. Lens module 110 may further include a lens barrel (not shown) for holding lenses 120 and a lens mount (not shown) for securing lenses 110 and/or the lens barrel to stage 130. In one embodiment, one or more of lenses 120 may have a diameter in the range of about 10 microns to about 20 microns.

Actuator 160 may be in electrical, mechanical, and/or electro-magnetic communication (not shown) with stage 130 for controlling the position of stage 130. In this regard, actuator 160 may be implemented in accordance with any appropriate mechanism for providing controlled movements on a scale appropriate for personal electronic device 102. For example, in various embodiments, actuator 160 may be implemented as a Lorentz motor, a micro-electro-mechanical systems (MEMS) device, or other appropriate apparatus such as, for example, those disclosed in U.S. patent application Ser. No. 11/190,307 filed on Jul. 26, 2005 and entitled "MEMS Digital Linear Actuator" which is incorporated herein by reference, or those disclosed in U.S. patent application Ser. No. 11/263, 149 filed on Oct. 31, 2005 and entitled "Lorentz Actuator For Miniature Camera" which is incorporated herein by reference.

Stage 130 may be translated toward or away from image sensor 170 by actuator 160 along an axis 140. In this regard, a desired one of lenses 120 may be selectively positioned at any of a plurality of positions 150 along axis 140 by translating stage 130 (and thereby translating lenses 120) to a desired one of positions 150. For example, in the embodiment illustrated in FIG. 1, a center of a lens 120A is aligned with position 150B along axis 140. In one embodiment, positions 150 may be spaced approximately 20 microns apart.

Image sensor 170 may be configured to capture digital images of object 105 from light 197 passing through lenses 120. Image sensor 170 may be implemented using any appropriate technology for capturing digital images such as, for example, a charge-coupled device (CCD) or complimentary metal-oxide semiconductor (CMOS) device. Images of object 180 captured by image sensor 170 can be provided to AF processor 160.

AF processor 180 may be configured with appropriate hardware and/or software to perform various operations as further described herein. AF processor 180 may provide control signals 185 to actuator 160 for controlling the movement of stage 130 and lenses 120. Function generator 190 may be configured with appropriate hardware and/or software to provide control signals 195 to actuator 160 which may be combined with control signals 185 as illustrated in FIG. 1.

Figure 2:
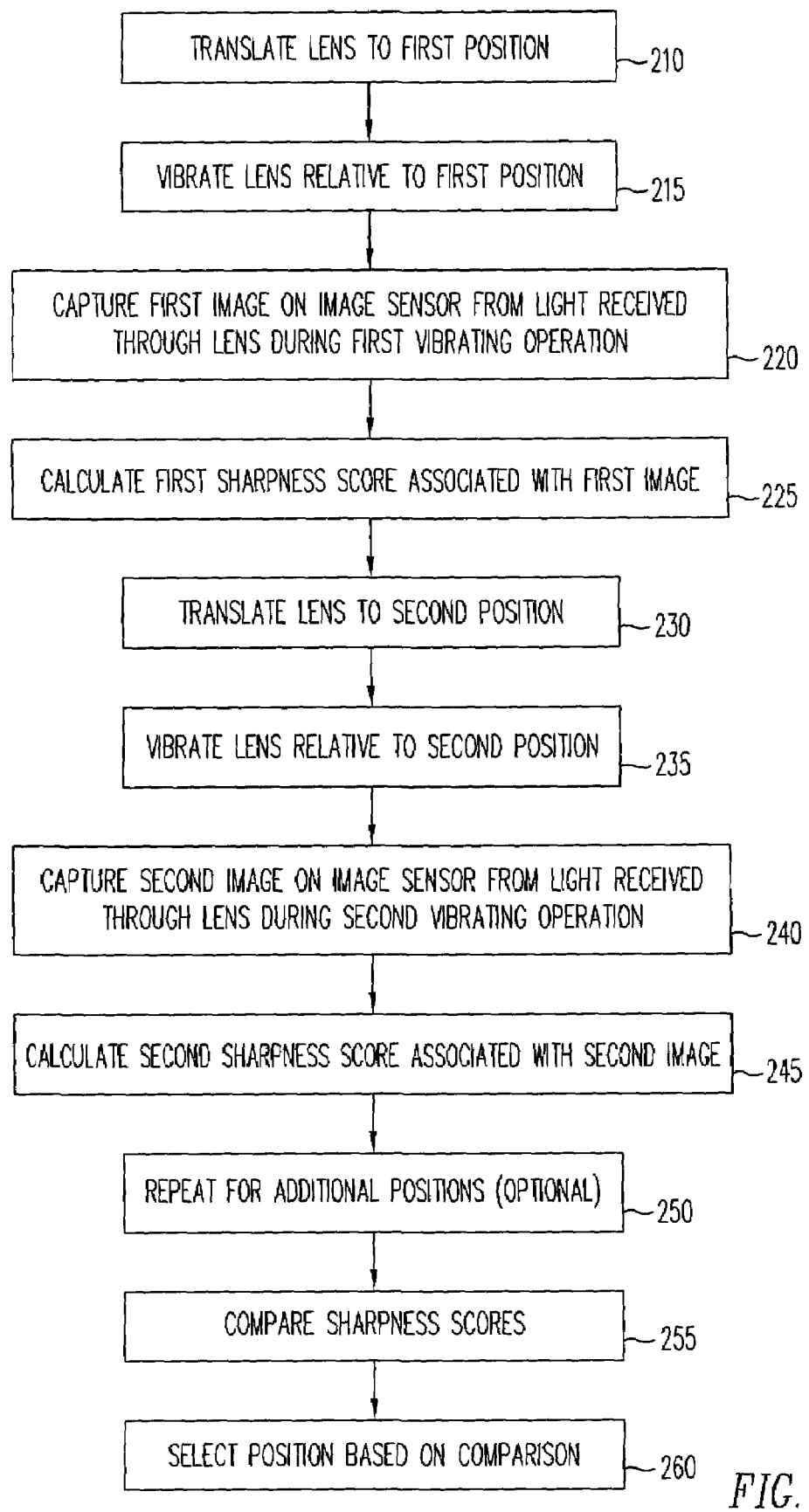
FIG. 2 illustrates a process of adjusting a focus of a camera in accordance with an embodiment of the invention.

FIG. 2 illustrates a process of adjusting a focus of camera 100 in accordance with an embodiment of the invention. In step 210, actuator 160 initially translates lens 120A to a first position by, for example, moving stage 130 in response to control signals 185 provided by AF processor 180. In the example of FIG. 1, lens 120A is shown following the performance of step 210 with lens 120A having been translated to a first position corresponding to position 150B along axis 140.

In step 215, actuator 160 vibrates lens 120A relative to first position 150B by, for example, moving stage 130 in response to control signals 195 provided by function generator 190. In this regard, function generator 190 may be configured to provide an oscillating lens displacement waveform (e.g., a sinusoidal waveform or other waveform) through control signals 195. For example, step 215 may be performed by oscillating lens 120A between positions 150A and 150C in response to the waveform provided by function generator 190 through control signals 195.

Figure 3:
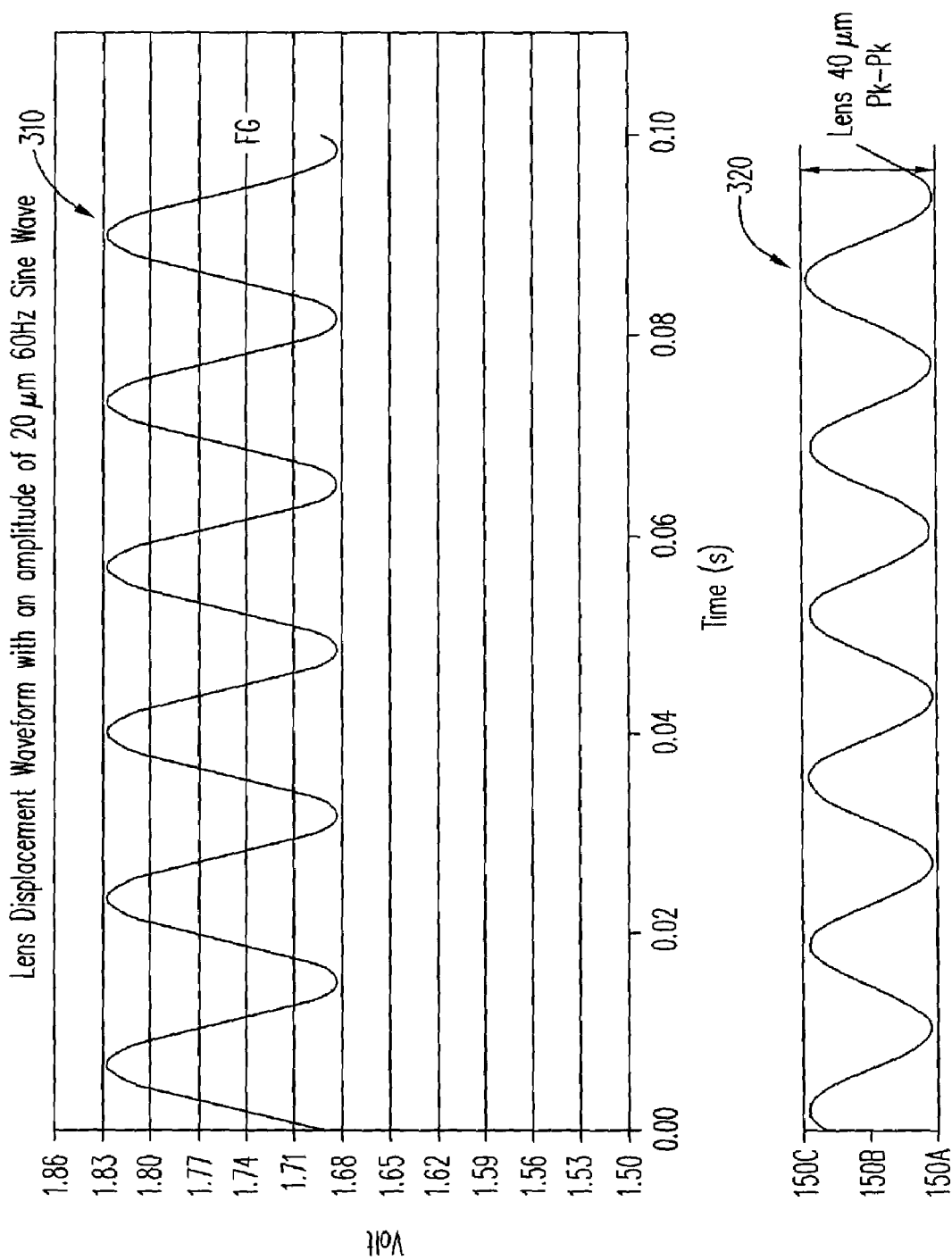
FIG. 3 illustrates a lens displacement waveform and a plot of a corresponding physical lens displacement in accordance with an embodiment of the invention.

FIG. 3 illustrates a lens displacement waveform 310 provided by function generator 190 through control signals 195 during step 215. In addition, FIG. 3 illustrates a plot 320 of the displacement of lens 120A in response to control signals 195.

As shown in the embodiment provided in FIG. 3, the application of waveform 310 to actuator 160 may cause lens 120A to oscillate in a sinusoidal fashion between positions 150A and 150C by a peak-to-peak distance of approximately 40 microns. As also shown in the embodiment provided in FIG. 3, waveform 310 may be implemented with a frequency of approximately 60 Hz. However, other frequencies and other peak-to-peak distances are also contemplated.

In step 220, image sensor 170 captures a first image of object 105 from light 197 received through lens 120A while actuator 160 continues to vibrate stage 130 and lens 120A in response to control signals 195 provided by function generator 195 in step 215. It will be appreciated that while lens 120A continues to oscillate between positions 150A and 150C during step 220, lens 120A will be repeatedly translated back and forth in directions pointing substantially away from and substantially toward image sensor 170 as indicated by the arrow between positions 150A and 150C shown in FIG. 1. As a result, in-focus portions of the first image captured in step 220 may be slightly blurred, and out-of-focus portions of the first image may be significantly blurred. As further described herein, such results can improve the accuracy of a determination of an in-focus position 150 by AF processor 180.

In step 225, AF processor 180 calculates a first sharpness score associated with the first image previously captured in step 220. In this regard, it will be appreciated that AF processor 180 may perform a linear or non-linear analysis of the first image through, for example, the application of a sharpness filter (e.g., a Sobel filter, a Laplacian filter, or others) to obtain the first sharpness score as will be appreciated by those skilled in the art. In step 230, actuator 160 translates lens 120A to a second position such as, for example, position 150C along axis 140 in response to control signals 185. In step 235, actuator 160 vibrates lens 120A relative to second position 150C by, for example, moving stage 130 in response to control signals 195 provided by function generator 190. For example, step 235 may be performed by oscillating lens 120A between positions 150B and 150D in response to the waveform provided by function generator 190.

In step 240, image sensor 170 captures a second image of object 105 from light 197 received through lens 120A while actuator 160 continues to vibrate stage 130 and lens 120A in response to control signals 195 in step 235. It will be appreciated that while lens 120A continues to oscillate between positions 150B and 150D during step 240, lens 120A will be repeatedly translated back and forth in directions pointing substantially away from and substantially toward image sensor 170 as indicated by the arrow between positions 150B and 150D shown in FIG. 1. As a result, in-focus portions of the second image captured in step 240 may be slightly blurred, and out-of-focus portions of the second image may be significantly blurred as similarly described above in relation to previous step 220.

In one embodiment, an elapsed time between the capturing operations of steps 220 and 240 may be greater than time periods associated with the oscillations associated with the vibrations of steps 215 and 235. In this regard, each of the vibration operations of steps 215 and 235 may be performed by oscillating lens 120A at a higher frequency than the frequency of the capturing operations of steps 220 and 240. For example, in one embodiment, waveform 310 may have a frequency of approximately 60 Hz and image sensor 170 may have a frame rate of approximately 15 frames per second causing capturing operations of steps 220 and 240 to occur at approximately 15 Hz. In another embodiment, the frequency of the vibration operations of steps 215 and 235 may be synchronized with the frame rate of image sensor 170 to reduce phase errors.

In step 245, AF processor 180 calculates a second sharpness score associated with the second image previously captured in step 240. It will be appreciated that the second sharpness score may be calculated in a similar manner to that described above in relation to previous step 225.

In optional step 250, one or more of the preceding steps may be repeated as many times as desired to obtain additional sharpness scores associated with additional positions 150 along axis 140. For example, in one embodiment, lens 120A may be translated to a third position such as, for example, position 150D along axis 140 (see FIG. 1). Actuator 160 may vibrate lens 120A relative to third position 150C by, for example, oscillating lens 120A between positions 150C and 150E, and a third image of object 105 may be captured by image sensor 170 during the vibration. AF processor 180 may then calculate a third sharpness score associated with the third image in a similar manner to that described above in relation to previous steps 225 and 245. It will be appreciated that sharpness scores can accordingly be determined for each of the positions 150 along axis 140.

Following step 250, it will be appreciated that AF processor 180 will have obtained first and second sharpness scores associated with first and second positions 150B and 150C, respectively, and possibly additional sharpness scores associated with additional positions 150 along axis 140 (e.g., position 150D).

Figure 4:
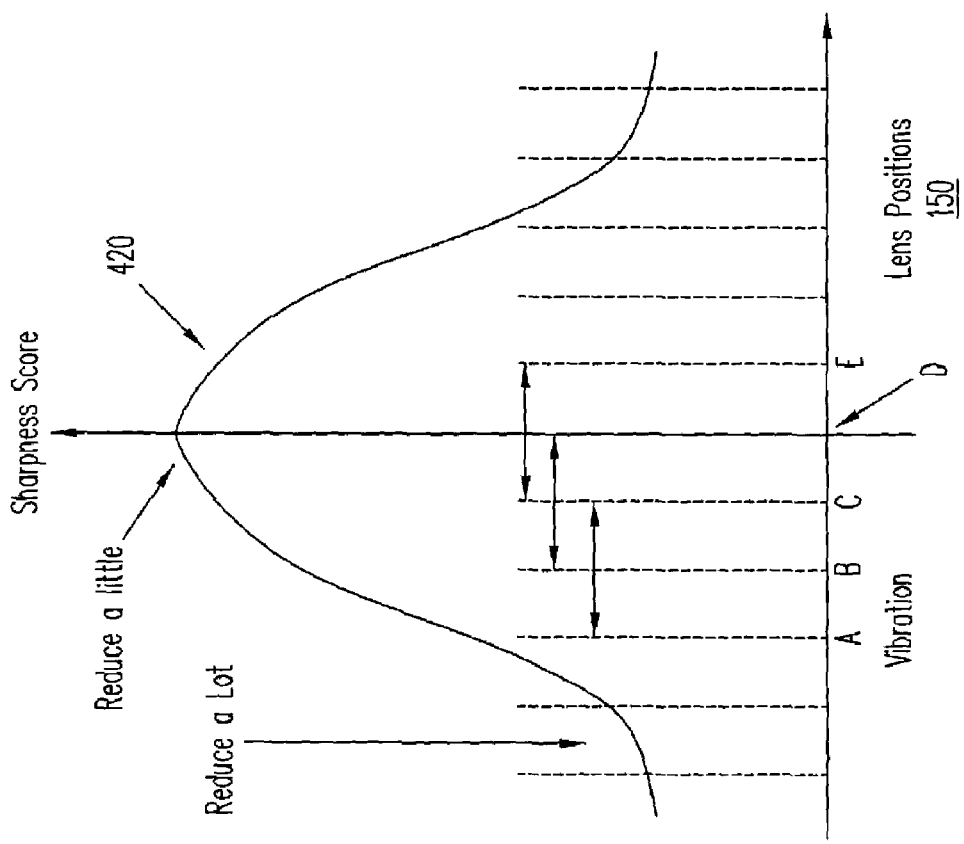
FIG. 4 illustrates sharpness plots comparing results obtained in accordance with an embodiment of the invention.
Figure 4:
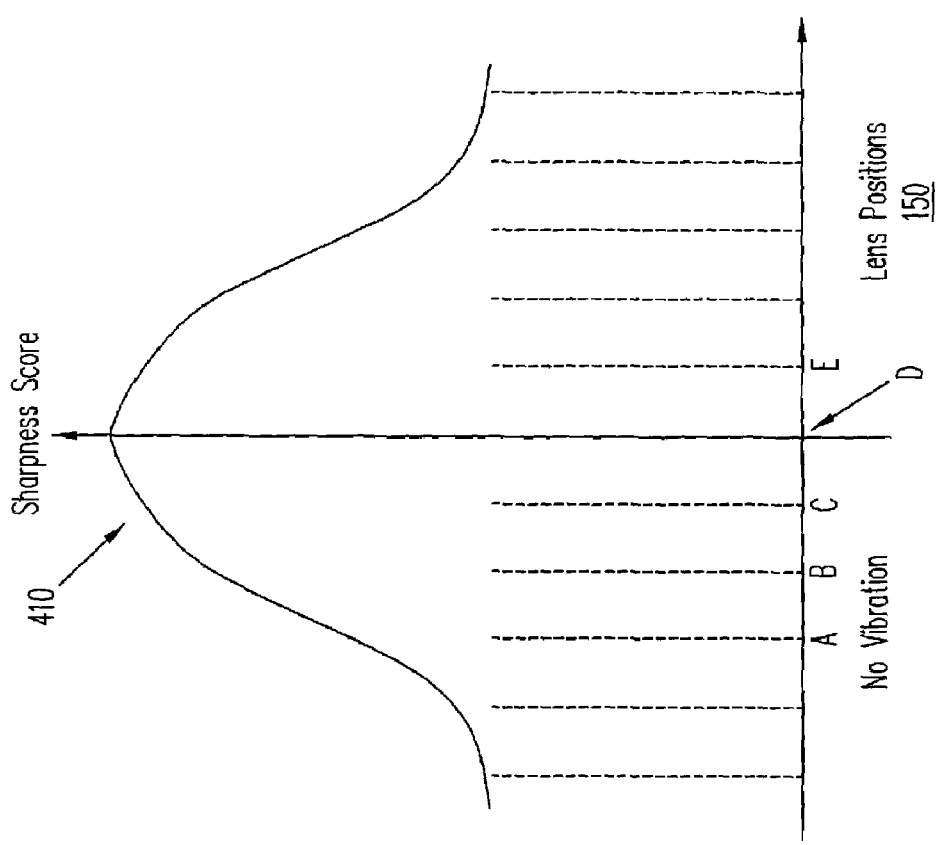

FIG. 4 illustrates sharpness plots 410 and 420 comparing results obtained in accordance with an embodiment of the invention. In particular, plot 410 illustrates a plurality of sharpness scores determined by AF processor 180 at a plurality of positions 150 along axis 140 for images captured while lens 120A is stationary without any vibration induced by function generator 190 (e.g., if steps 215 and 235 are not performed). In contrast, plot 420 illustrates a plurality of sharpness scores determined by AF processor 180 at a plurality of positions 150 along axis 140 for images captured while lens 120A is vibrating in response to function generator 190 (e.g., if steps 215 and 235 are performed).

In step 255, AF compares the sharpness scores obtained during the preceding steps to determine the peak sharpness score. As shown in FIG. 4, plot 420 exhibits a lower peak sharpness score (i.e., at position 150D) than plot 410 due to blurring of the images captured during the vibration of lens 120A. However, as also shown in FIG. 4, plot 420 exhibits a steeper slope than plot 420 on either side of its peak sharpness score.

As previously discussed, the vibration of lens 120A may reduce the sharpness of out-of-focus scenes in captured images to a greater extent than the sharpness of in-focus scenes. As a result, the sharpness scores of out-of-focus positions (for example, positions to the left and right of position 150D) may be significantly lower in plot 420 than in plot 410. Consequently, plot 420 exhibits steeper slopes on either side of position 120D than plot 410. Accordingly, it will be appreciated that the peak sharpness score (i.e., corresponding to position 150D) can be more easily ascertained by AF processor 180 in step 255 using plot 420 than plot 410 due to the steeper slopes of plot 420 (e.g., plot 420 exhibits greater differences between adjacent sharpness scores than plot 410).

In step 260, AF processor 180 selects the position associated with the peak sharpness score (here, position 150D). AF processor 180 may thereafter translate lens 120A to the selected position to permit subsequent focused images of object 105 to be captured by image sensor 170.

In view of the present disclosure, it will be appreciated that an improved approach to focusing a camera as set forth in the various embodiments described herein can provide improved accuracy in the determination of image sharpness. In particular, by vibrating one or more lenses of a camera during image capture operations, sharpness scores calculated for adjacent or nearby lens positions can exhibit a steeper slope, thereby permitting an appropriately configured processor to easily determine a peak sharpness score associated with an in-focus image. As a result, a desired lens position associated with the peak sharpness score can also be easily determined.

Where applicable, the various components set forth herein can be combined into composite components and/or separated into sub-components without departing from the spirit of the invention. Similarly, where applicable, the ordering of various steps described herein can be changed, combined into composite steps, and/or separated into sub-steps to provide features described herein.

The foregoing disclosure is not intended to limit the invention to the precise forms or particular fields of use disclosed. It is contemplated that various alternate embodiments and/or modifications to the invention, whether explicitly described or implied herein, are possible in light of the disclosure.

Having thus described embodiments of the invention, persons of ordinary skill in the art will recognize that changes may be made in form and detail without departing from the scope of the invention. Thus the invention is limited only by the following claims.

What is claimed is:

1. A method of adjusting a focus of a camera, the method comprising:
    translating a lens to a first position;
    vibrating the lens relative to the first position so as to tend to vary the focus provided by the lens, the vibrating being performed using an actuator;
    capturing a first image on an image sensor from light received through the lens while the vibration of the lens relative to the first position is maintained;
    calculating a first sharpness score associated with the first image;
    translating the lens to a second position;
    vibrating the lens relative to the second position so as to tend to vary the focus provided by the lens, the vibrating being performed using the actuator;
    capturing a second image on the image sensor from light received through the lens while the vibration of the lens relative to the second position is maintained; and
    calculating a second sharpness score associated with the second image.

2. The method of claim 1, further comprising comparing the first and second sharpness scores.

3. The method of claim 2, further comprising selecting one of the first or second positions in response to the comparing.

4. The method of claim 1, wherein the vibrating the lens relative to the first position comprises oscillating the lens between a third position and a fourth position relative to the first position, and wherein the vibrating the lens relative to the second position comprises oscillating the lens between a fifth position and a sixth position relative to the second position.

5. The method of claim 4, wherein the first position corresponds approximately to one of the fifth or sixth positions, and wherein the second position corresponds approximately to one of the third or fourth positions.

6. The method of claim 4, wherein one of the third or fourth positions corresponds approximately to one of the fifth or sixth positions.

7. The method of claim 1, wherein an elapsed time between the capturing operations is greater than a period of each of the oscillating operations.

8. The method of claim 1, wherein each of the oscillating operations oscillates the lens at a higher frequency than a frequency of the capturing operations.

9. The method of claim 1, wherein each of the oscillating operations oscillates the lens at a frequency of approximately 60 Hz.

10. The method of claim 1, wherein the vibrating operations are performed in response to a control signal.

11. The method of claim 10, wherein the control signal is provided by a function generator.

12. The method of claim 10, wherein the control signal is a sinusoidal signal.

13. The method of claim 1, wherein the calculating operations are performed using a Sobel filter.

14. The method of claim 1, wherein the calculating operations are performed using a Laplacian filter.

15. A miniature camera comprising:
   a stage;
   a lens secured relative to the stage;
   an image sensor adapted to capture images from light received through the lens;
   a function generator adapted to provide a control signal;
   an actuator adapted to:
   translate the lens to a plurality of positions relative to the image sensor,
   vibrate the lens relative to a first one of the positions in a manner that tends to vary a focus provided by the lens while the image sensor captures a first image, and
   vibrate the lens relative to a second one of the positions in a manner that tends to vary the focus provided by the lens while the image sensor captures a second image; and
   an autofocus processor adapted to calculate first and second sharpness scores associated with the first and second images, respectively.

16. The camera of claim 15, wherein the autofocus processor is further adapted to compare the first and second sharpness scores.

17. The camera of claim 16, wherein the autofocus processor is further adapted to select one of the first or second positions based on a comparison of the first and second sharpness scores.

18. The camera of claim 15, wherein the actuator is adapted to vibrate the lens at a rate faster than an image capture rate associated with the image sensor.

19. The camera of claim 18, wherein the control signal is a sinusoidal signal.

20. The camera of claim 18, wherein the control signal has a frequency of approximately 60 Hz.

21. The camera of claim 15, wherein the autofocus processor is adapted to calculate the first and second sharpness scores using a Sobel filter.

22. The camera of claim 15, wherein the autofocus processor is adapted to calculate the first and second sharpness scores using a Laplacian filter.

23. The camera of claim 15, wherein the camera is a still camera.

24. The camera of claim 15, wherein the camera is a video camera.

25. The camera of claim 15, wherein the camera is part of a personal electronic device.

26. A miniature camera comprising:
   a lens;
   means for capturing images from light received through the lens;
   means for generating a control signal;
   means for translating the lens to a plurality of positions relative to the capturing means;
   means for vibrating the lens relative to a first one of the positions in a manner that tends to vary a focus provided by the lens while the capturing means captures a first image;
   means for vibrating the lens relative to a second one of the positions in a manner that tends to vary the focus provided by the lens while the capturing means captures a second image; and
   means for calculating first and second sharpness scores associated with the first and second images, respectively.

27. The camera of claim 26, further comprising means for comparing the first and second sharpness scores.

28. The camera of claim 27, further comprising means for selecting one of the first or second positions in response to the comparing means.

29. The camera of claim 26, wherein the camera is a still camera.

30. The camera of claim 26, wherein the camera is a video camera.

31. The camera of claim 26, wherein the camera is part of a personal electronic device.

* * * * *